United States Patent [19]

Weisemann et al.

[11] Patent Number: 5,229,155
[45] Date of Patent: Jul. 20, 1993

[54] PROCESS FOR IMPROVING SECONDARY COFFEE EXTRACTS IN THE PRODUCTION OF SOLUBLE COFFEE

[75] Inventors: Claus Weisemann, Bergisch-Gladabach; Klaus D. Koch, Breman; Christiane Stelter, Langenfeld, all of Fed. Rep. of Germany

[73] Assignee: Jacobs Suchard AG, Zurich, Switzerland

[21] Appl. No.: 755,252

[22] Filed: Sep. 5, 1991

[51] Int. Cl.$^5$ .............................................. A23F 5/48
[52] U.S. Cl. ................................. 426/423; 426/422; 426/424; 426/432
[58] Field of Search ............... 426/422, 271, 423, 424, 426/425, 427, 432

[56] References Cited

U.S. PATENT DOCUMENTS 4,113,887  9/1978  Kramer et al. ................... 426/422

FOREIGN PATENT DOCUMENTS 0013451  7/1980  European Pat. Off. .
0078121  5/1983  European Pat. Off. .
0078618  5/1983  European Pat. Off. .
0151772  8/1985  European Pat. Off. .
3400768  7/1985  Fed. Rep. of Germany .
0268151  5/1989  German Democratic Rep. .

*Primary Examiner*—Jeanette Hunter
*Assistant Examiner*—Helen Pratt
*Attorney, Agent, or Firm*—Thomas A. Marcoux; Linn I. Grim; Thomas R. Savoie

[57] ABSTRACT

In a process for deacidifying and improving the flavor of so called secondary extracts obtained in the production of instant coffees, the secondary extracts are pumped over alkaline molecular sieves and are therewith completely or partially liberated from acids and flavor-impeding organic compounds.

10 Claims, 1 Drawing Sheet

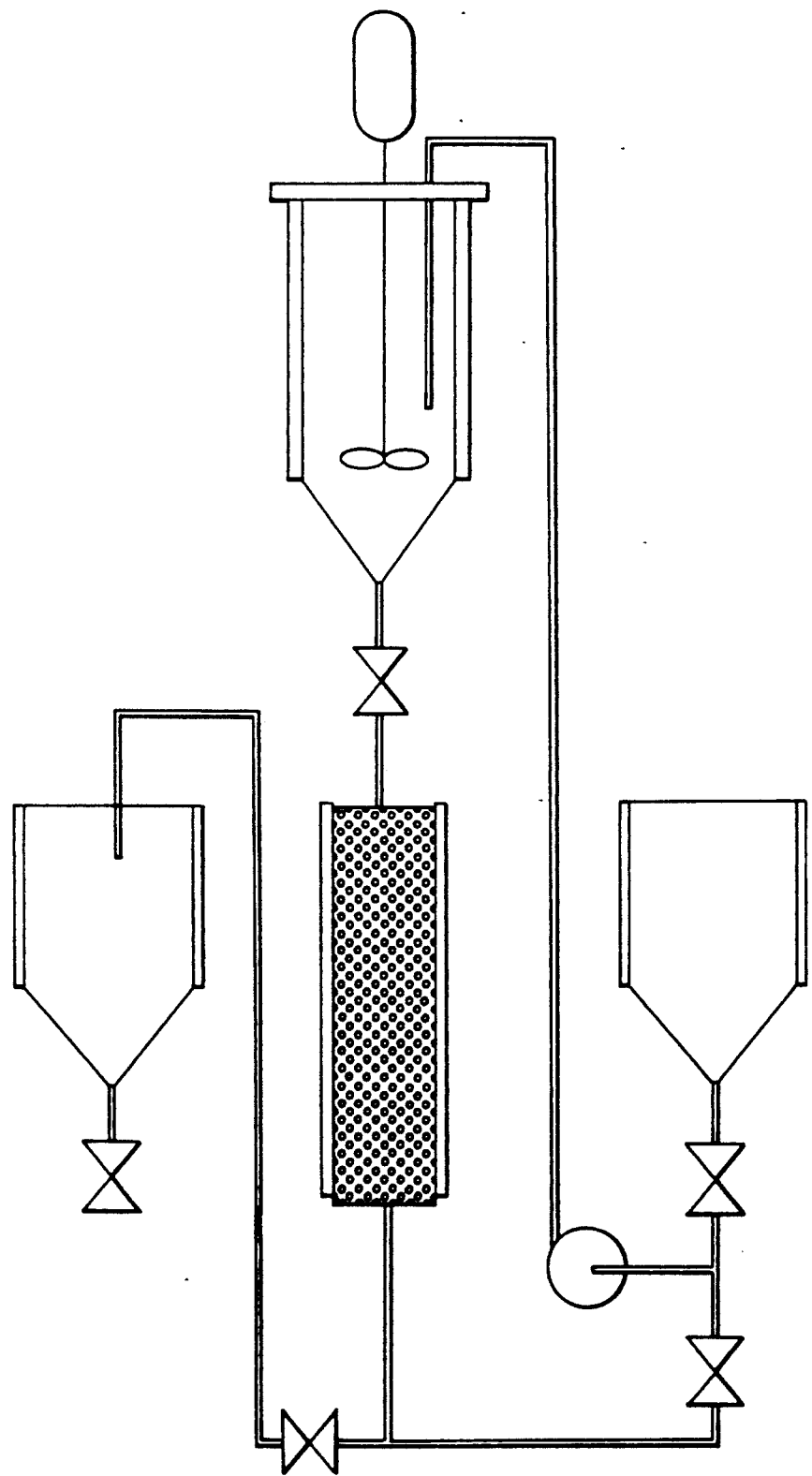
Figure

PROCESS FOR IMPROVING SECONDARY COFFEE EXTRACTS IN THE PRODUCTION OF SOLUBLE COFFEE

BACKGROUND OF THE INVENTION

The invention relates to a process for improving the flavor of secondary coffee extracts, especially for the production of soluble, i.e. instant coffees.

In the production of coffee extracts, first a primary extract from roast coffee is obtained under mild temperature and pressure conditions. Said primary extract usually has a high quality nearly reaching that of instant coffee infusions used in households. This primary extraction can for example be conducted in a percolator with hot water.

The primary extraction step has a yield of only 20 to 30% and it was therefore quite obvious to increase the yield by means of a second extraction step. This additional extraction is conducted under more rigorous temperature and pressure conditions (EP-A-151 772). However the resulting secondary extract has a high acid content which is found to be unpleasant as regards flavor and furthermore, said extract has unpleasant flavor notes which are often called "hydrolytic flavor". These unpleasant notes impede the quality of the final product and add to the typical taste of soluble coffee which is different from ordinary roast coffee infusions.

Consequently, a number of methods for treating secondary coffee extracts have been proposed. EP-A-78 121 discloses for example the removal of undesirable substances from secondary coffee extract by means of a liquid/liquid-extraction with a plant oil. EP-A-78 618 suggests to treat secondary extracts with solid organic polymeres and DE-A-34 00 768 to treat them with low-alkalinity ion-exchangers.

DD-A-268 151 relates to a process for stabilizing the aroma of ground coffee which is supposed to result in a roast coffee with improved organoleptic properties and a higher storage stability. It is proposed to treat the ground roast coffee with adsorption agents such as finely or coarsely pored silica gels and synthetic or naturally occurring zeolites.

EP-A-13 451 discloses a process for removing caffeine from aqueous solutions of green or roasted coffee beans with a certain crystalline zeolitc molecular sieve of the Y-type, namely the UHP-Y, which has a high selectivity for caffeine.

SUMMARY OF THE INVENTION

The invention is based on the object to provide a process for treating secondary roast coffee extracts which is suitable to clearly improve the flavor of the secondary extract without reducing the content of dissolved flavor-enhancing substances in the extract.

This object is attained by treating the secondary extract with alkaline molecular sieves.

DETAILED DESCRIPTION OF THE PREFERRED EMBODIMENTS

According to a preferred embodiment of the invention, an alkaline molecular sieve with a pore size of approximately 0.3 to 1 nm is employed to reduce the content of suspended material, i.e. the content of undissolved and finely suspended particles in the beverage. The molecular sieves Merck Art.-No. 5703, 5704, 5705. Fluka Art.-No. 69831, 69834, 69842, 69844, 69848 and/or 69855 are particularly suitable for this purpose. The treatment for removing the off-flavor notes can be conducted in a particularly expedient way by circulating the secondary coffee extract over the molecular sieve being present in a column or by a direct flow through a column filled with a molecular sieve, the residence time being regulated by the flow speed or the length of the column. The change of the pH-value in the secondary extract can be regulated by varying the ratio of molecular sieve to secondary extract. The change of the pH-value in the secondary extract can also be regulated via the recirculation period. On the other hand, the respective pH-value which is determined during treatment can be regarded as a regulating variable for the treatment period or for setting a certain flavor note.

The treatment results are particularly favorable, if, prior to the actual treatment, the molecular sieve material is conditioned over a water vapor phase up to a water absorption of 7 to 30%. For regeneration, the molecular sieve material is washed with diluted aqueous sodium hydroxide solution or potassium hydroxide solution in a concentration of approximately 1 to 5% and is subsequently rinsed with demineralized water until the rinsing water has a pH-value of approximately 9. The ratio by weight of molecular sieve to secondary coffee extract to be treated can range from between about 1:30 to 1:5. Particularly good results are achieved with a ratio of 1:8 to 1:12.

The extract resulting from the ion-exchanger treatment of the secondary coffee extract is different from the secondary extract resulting from the molecular sieve treatment in that in the latter treatment, selectively small organic molecules are removed, whereas in an ion-exchanger treatment there is an unspecific adsorption. In contrast to the ion-exchanger treatment, no solids are lost in the molecular sieve treatment.

The process as taught by the invention attains a significant improvement of the flavor of the secondary extract as well as of the final product obtained by mixing the secondary with the primary extract. This improvement was tasted and confirmed by coffee experts and it can also be analytically measured by a reduction of the furfural content used as an off-flavor indicator in instant coffees. The treatment period only ranges from approximately 5 to 20 min., and there is no or only an insignificant loss of solids. But since, on the other hand there is a significant reduction of the content of suspended material, i.e. a better solubility of the product, there may also be a positive effect on the tactile sensation when the beverage is consumed.

BRIEF DESCRIPTION OF THE DRAWINGS

The flow chart describes the present invention according to a preferred embodiment.

Prior to the molecular sieve treatment, the material was treated with acidic coffee extract or diluted acetic acid having a pH-value of approximately 4.5, in order to wash out mobile aluminium. Subsequently, the material was washed with NaOH in a concentration of 5% and then rinsed with demineralized water until the rinsing water had acquired a pH-value of approximately 9. The molecular sieve material is located in a column provided with a cooling or heating wall. The still warm secondary extract is pumped from a storage tank to a mixing tank comprising an agitator and is from there passed to the column heated to 50° to 70° C. After the desired pH-value is reached, the treated secondary coffee extract is transferred to the receiving tank and is then made into instant coffee in the customary way.

The following examples shall further illustrate the invention and describe the process as taught by the invention on a laboratory and on an industrial scale.

EXAMPLE 1

The molecular sieve material Merck Art.-No. 5703 was preconditioned in a desiccator which had been charged with 300 ml of water until the molecular sieve material had a water content of 7.4%. 25 g of this material were introduced to a glass column provided with a heating wall. A second heatable column served as a buffer and storage vessel. 200 ml secondary extract with a gravimetrically determined solids content of 2.75% and a pH-value of 4.38 was pumped with a flow inducer over the molecular sieve material for a period of 9.5 min. In this process, the heating wall of the columns had a temperature of 70° C. At the end of the test the pH-value had risen to 5.68 and no loss of solids could be found. The quantity of titrable acid (up to pH 8) had decreased from approximately 80 mmol to approximately 27 mmol. with respect to 100 g of solids. The formation of precipitations after a settling period of 20 hours at a temperature of 20° C. was also reduced by approximately 25%.

In an organoleptic test, the secondary extract was mixed with the primary extract in the ratio of 1:1 and was consumed. A raw secondary extract which had not been treated according to the process as taught by the invention was tested in the same way. Coffee experts clearly preferred the mixture with the treated secondary extract.

EXAMPLE 2

1.4 kg molecular sieve material 10 A, Merck Art.-No. 5703 was pretreated as described above until it had acquired a water content of 11.8%. Again, the material was filled in a column of the above-described type and 16 kg of secondary coffee extract with a solids content of approx. 2.6% were pumped in a cycle through the column charged with the molecular sieve at a flow rate of 2.3 l/min. After an average contacting period of 16 min., the extract was pumped out of the cycle and after samples were taken for analytical tests, said extract, together with the primary extract, was made into soluble coffee.

Gravimetrically, no reduction of solids could be found. The pH-value had increased to 5.8, and the titrable acid content had decreased from approximately 71 mmol to approximately 23 mmol, with respect to 100 g solids in a titration of up to pH 8. A product which was prepared according to the ordinary process was also tested and the results of these tests were compiled in the following table.

|  | no treatment | molecular sieve treatment |
|---|---|---|
| water content (%) | 2.35 | 1.60 |
| caffeine (%) | 0.09 | 0.07 |
| titrable acid (mmol)* | 84.4 | 76.5 |
| acetate (% acid) | 0.66 | 0.66 |
| formiate (% acid) | 1.65 | 1.70 |
| HMF (ppm) | 479 | 476 |
| furfural (ppm) | 50 | 26 |
| sulphate ash (g) | 10.0 | 10.9 |

*in a titration of up to pH 9

The two final products were tasted by coffee experts with the surprisingly clear result that the product made with the treated secondary extract was clearly superior and was found milder and very neutral.

We claim:

1. A process for improving the flavor of secondary coffee extract by removing unpleasant flavor notes and excess acid from said extract which comprises contacting said extract with an alkaline molecular sieve having a pore size of about 0.3 to 1.0 nm and a ratio by weight of molecular sieve to extract of between about 1:5 and 1:30 for about 5 to 20 minutes to thereby adsorb said unpleasant flavor notes and excess acid on said molecular sieve.

2. The process of claim 1 wherein the molecular sieve is conditioned to a water content of about 7 to 30% prior to contact with the extract.

3. The process of claim 2 wherein the molecular sieve is present as a column and the ratio of said sieve to extract is between about 1:8 and 1:12.

4. The process of claim 3 wherein the secondary extract is recirculated over the molecular sieve and the pH-value is regulated via the recirculation period.

5. The process of claim 3 wherein a change of the pH-value is regulated via the ratio of molecular sieve to secondary extract.

6. The process of claim 4 wherein the contact between the secondary extract and the molecular sieve is carried out at a temperature of about 50° to about 70° C.

7. The process of claim 5 wherein the contact between the secondary extract and the molecular sieve is carried out at a temperature of about 50° to about 70° C.

8. The process of claim 4 wherein the upgraded secondary extract is mixed with a primary extract.

9. The process of claim 5 wherein the upgraded secondary extract is combined with a primary extract.

10. The process of claims 8 or 9 wherein the secondary extract and the primary extract are mixed at a ratio of 1:1.

* * * * *